(12) United States Patent
Jung et al.

(10) Patent No.: US 11,542,038 B2
(45) Date of Patent: Jan. 3, 2023

(54) MOBILE ROBOT AND CARGO TRANSPORTING SYSTEM INCLUDING THE SAME

(71) Applicants: Hyundai Motor Company, Seoul (KR); Kia Motors Corporation, Seoul (KR)

(72) Inventors: Sang Hyun Jung, Hwaseong-si (KR); Jae Young Choi, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 17/144,372

(22) Filed: Jan. 8, 2021

(65) Prior Publication Data
US 2022/0048645 A1 Feb. 17, 2022

(30) Foreign Application Priority Data
Aug. 12, 2020 (KR) .......................... 10-2020-0100967

(51) Int. Cl.
*B64F 1/32* (2006.01)
*B66F 9/06* (2006.01)

(52) U.S. Cl.
CPC .............. *B64F 1/322* (2020.01); *B66F 9/063* (2013.01)

(58) Field of Classification Search
CPC ................................. B64F 1/322; B66F 9/063
See application file for complete search history.

(56) References Cited

U.S. PATENT DOCUMENTS 10,994,865 B2 * 5/2021 Daw Perez ............ B65G 67/00
2019/0202561 A1 7/2019 Weekes et al.
2021/0394660 A1 * 12/2021 Crawford, Jr. ....... B65G 1/1371

FOREIGN PATENT DOCUMENTS

KR 10-2018-0031114 A 3/2018

* cited by examiner

*Primary Examiner* — Kaitlin S Joerger
(74) *Attorney, Agent, or Firm* — Morgan, Lewis & Bockius LLP

(57) ABSTRACT

The present invention includes a mobile robot which transports a container configured of having a cargo contained therein to an air vehicle, loads the container at a predetermined loading place of the air vehicle, unloads the container from the air vehicle, identifies the unloaded container, and transports the identified container to a predetermined location.

15 Claims, 11 Drawing Sheets

MOBILE ROBOT AND CARGO TRANSPORTING SYSTEM INCLUDING THE SAME

CROSS REFERENCE TO RELATED APPLICATION

The present application claims priority to Korean Patent Application No. 10-2020-0100967 filed on Aug. 12, 2020, the entire contents of which is incorporated herein for all purposes by this reference.

BACKGROUND OF THE PRESENT INVENTION

Field of the Invention

The present invention relates to a mobile robot and a cargo transporting system including the same.

Description of Related Art

In a conventional cargo transporting system for moving a container having a cargo contained therein, the container cannot move by itself. Therefore, an operator needs to transport the container to the place where an airplane lands, and then load the container on the airplane in person.

Furthermore, since the airplane needs to move to the location where the container may be loaded, the airplane needs to have a wheel mounted therein, the wheel having a motor which is unnecessary during the flight.

Furthermore, when a plurality of containers are loaded on an airplane, a mismatch occurs between the center of gravity limit and the actual center of gravity due to differences in weight among the containers, which makes it difficult to control the airplane.

Therefore, there is a demand for the development of a system which transports a container, does not need to mount a wheel with an unnecessary motor in an airplane, and can load a plurality of containers on the plane in consideration of the center of gravity and the weights thereof even though the plurality of containers are loaded, stably controlling the airplane.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a mobile robot which can transport a container, does not need to mount a wheel with an unnecessary motor on an air vehicle, load a plurality of containers on the air vehicle in consideration of the center of gravity and weights of the containers even though the plurality of containers are loaded, stably controlling the air vehicle, and a cargo transporting system including the same.

A mobile robot may transport a container configured of having a cargo contained therein to an air vehicle, load the container at a predetermined loading place of the air vehicle, unload the container from the air vehicle, identify the unloaded container, and transport the identified container to a predetermined location.

The mobile robot may include at least one of: a base configured of having the container loaded thereon; a weight measurement sensor configured to measure the weight of the container; an identification sensor configured to identify information related to a destination of the container; a driving wheel configured to move the base; a first communication module configured to communicate with a server, the air vehicle or another mobile robot; and a first controller configured to determine the loading place of the air vehicle, at which the container is to be loaded, and control the mobile robot to load the container at the predetermined loading place or control the mobile robot to transport the container unloaded from the air vehicle, to the destination to which the container is to be transported, according to one or more pieces of information among the weight of the container measured by the weight measurement sensor, the destination of the container identified by the identification sensor, and various pieces of information related to the air vehicle.

When a plurality of mobile robots are provided, the mobile robots may share weight information related to the containers loaded on the bases in the respective mobile robots, and the first controllers included in the respective mobile robots may determine the total weight and the center of gravity of the containers to be loaded on the air vehicle, according to the shared weight information, and determine loading positions where the containers loaded on the respective mobile robots are to be loaded, based on the determined total weight and the determined center of gravity.

The base may have a first coupling portion to be coupled to the container, and the container may have a second coupling portion to be coupled to the base.

The first coupling portion may be formed on the top surface of the mobile robot, and have a protruding shape with a predetermined area and thickness, and the second coupling portion may have a first gap to which the first coupling portion is slid and fitted, wherein the first gap has a width that decreases from an entrance thereof, to which the first coupling portion is fitted, toward an opposite side thereof.

The width of the first gap formed in the second coupling portion may be equal to or greater than the width of the first coupling portion.

The mobile robot may further include a fastening portion including a first extension extended from a side surface of the base and a second extension extended upwards from an end portion of the first extension. The fastening portion may be inserted into the container having a space into which the second extension is inserted, and thus fastened to the container.

A cargo transporting system may include: an air vehicle having a loading space on which a container configured of having a cargo contained therein is loaded, and configured to transport the container to an assembly place of the container; and a mobile robot configured to transport the container to the air vehicle, load the container at a predetermined loading place of the air vehicle, unload the container from the air vehicle, identify the unloaded container, and transport the identified container to a predetermined location.

The mobile robot may include at least one of: a base configured of having the container loaded thereon; a weight measurement sensor configured to measure the weight of the container; an identification sensor configured to identify information related to a destination of the container; a driving wheel configured to move the base; a first communication module configured to communicate with a server, the air vehicle or another mobile robot; and a first controller configured to determine the loading place of the air vehicle, at which the container is to be loaded, and control the mobile robot to load the container at the predetermined loading place or control the mobile robot to transport the container unloaded from the air vehicle, to the destination to which the container is to be transported, according to one or more pieces of information among the weight of the container measured by the weight measurement sensor, the destination of the container identified by the identification sensor, and various pieces of information related to the air vehicle. The mobile robot may transmit one or more pieces of information among the weights and destinations of the respective containers to the server or the air vehicle through the first communication module.

The air vehicle may include: a body having an open bottom and a loading space on which the container is loaded, and including a door which is formed on a side surface thereof and opened or closed as the container is loaded or unloaded; a second communication module configured to communicate with the mobile robot or the server; and a second controller configured to select containers to be loaded on the air vehicle and determine a center of gravity of the selected containers, according to one or more pieces of information among the weights and destinations of the containers, transmitted from the mobile robots, and various pieces of information related to the air vehicle, and determine loading positions where the respective containers are to be coupled in the loading space, based on the determined center of gravity. The air vehicle may transmit the loading positions, to which the respective containers are to be coupled, to the mobile robots on which the selected containers are loaded, through the second communication module.

The mobile robot may have a first coupling portion to be coupled to the container, the container may have a second coupling portion formed on a bottom surface thereof to be coupled to the first coupling portion, and a third coupling portion formed on a top surface thereof to be coupled to the loading space of the air vehicle, and the air vehicle may have a fourth coupling portion formed on the loading space and coupled to the third coupling portion.

The first coupling portion may be formed on the top surface of the mobile robot, and have a protruding shape with a predetermined area and thickness, and the second coupling portion may have a first gap to which the first coupling portion is slid and fitted, wherein the first gap has a width that decreases from an entrance thereof, to which the first coupling portion is fitted, toward an opposite side thereof.

The third coupling portion may include a bottom portion having a predetermined area and thickness, a top portion having a predetermined area and thickness, and a connection portion connecting the top portion and the bottom portion and having a smaller area than the top and bottom parts. The fourth coupling portion may have a second gap which has a width equal to or greater than the thickness of the top portion of the third coupling portion such that the top portion of the third coupling portion is slid and fitted to the second gap, wherein the second gap has a width that decreases from an entrance thereof, to which the third coupling portion is fitted, toward an opposite side thereof.

The width of the second gap formed in the fourth coupling portion may be equal to or greater than the width of the connection portion of the third coupling portion.

The mobile robot may further include a fastening portion including a first extension extended from a side surface of the base and a second extension extended upwards from an end of the first extension. The fastening portion may be inserted into the container having a space into which the second extension is inserted, and fastened to the container.

In accordance with the exemplary embodiments of the present invention, the cargo transporting system may transport a container through the mobile robot, does not need to mount a wheel with an unnecessary motor on the air vehicle, load a plurality of containers on the air vehicle in consideration of the center of gravity and weights of the containers even though the plurality of containers are loaded, stably controlling the air vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
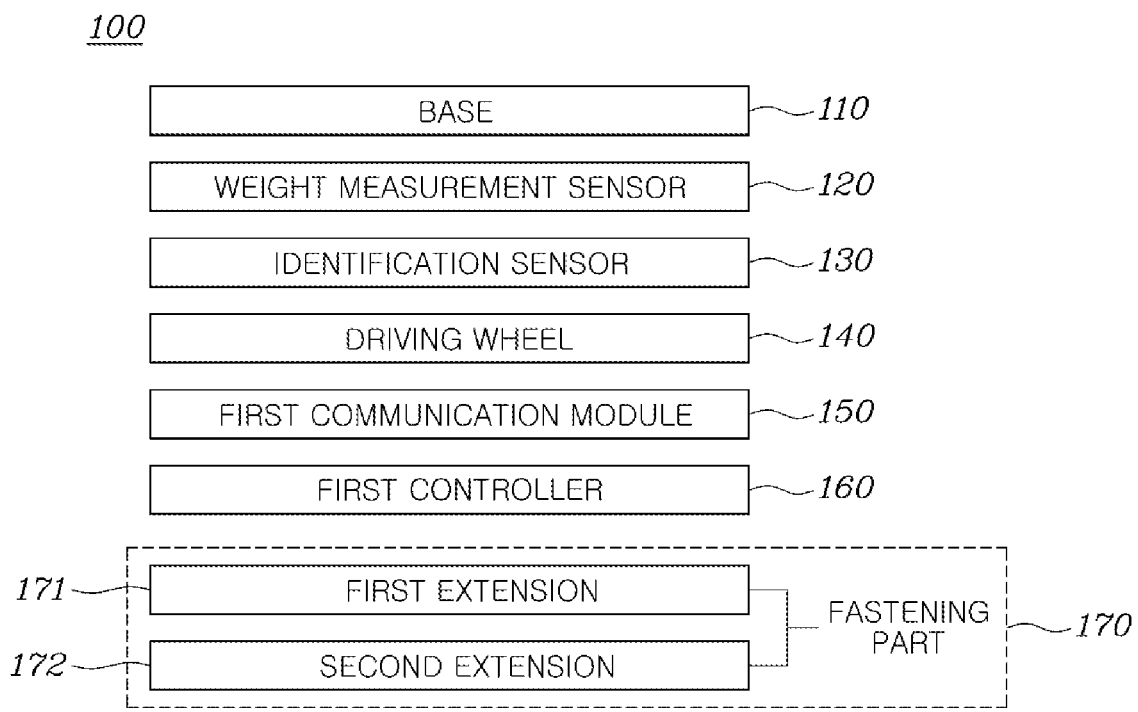
FIG. 1 is a block diagram schematically illustrating a detailed configuration of a mobile robot in accordance with various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereafter, a mobile robot and a cargo transporting system including the same in accordance with various exemplary embodiments of the present invention will be described in detail with reference to the accompanying drawings.

Figure 2:
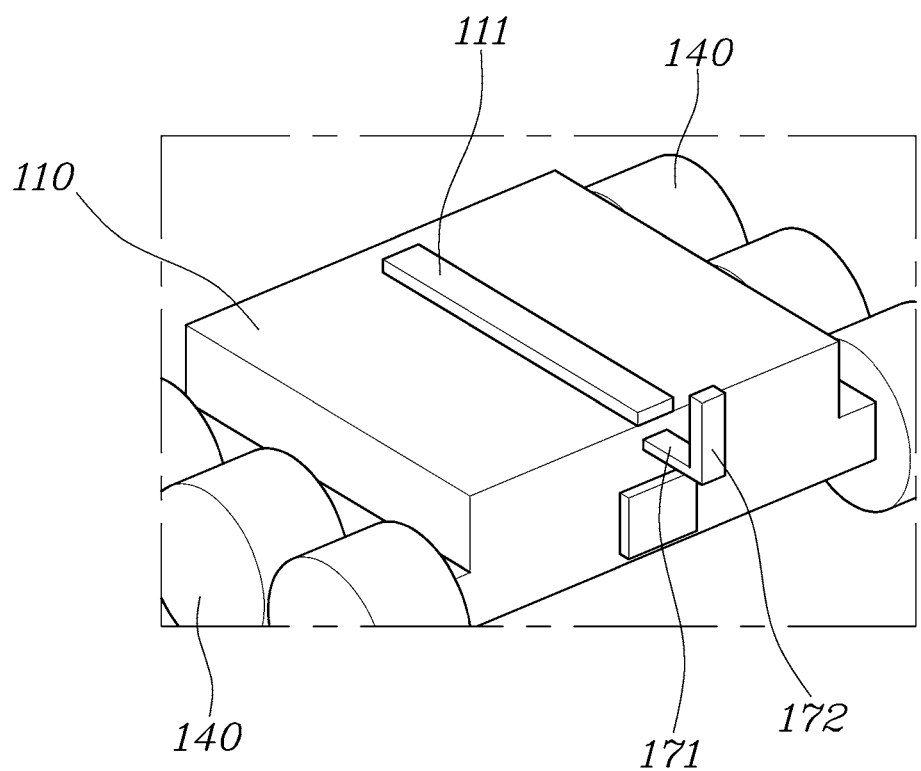
FIG. 2 is a perspective view exemplarily illustrating the mobile robot in accordance with the exemplary embodiment of the present invention.
Figure 3:
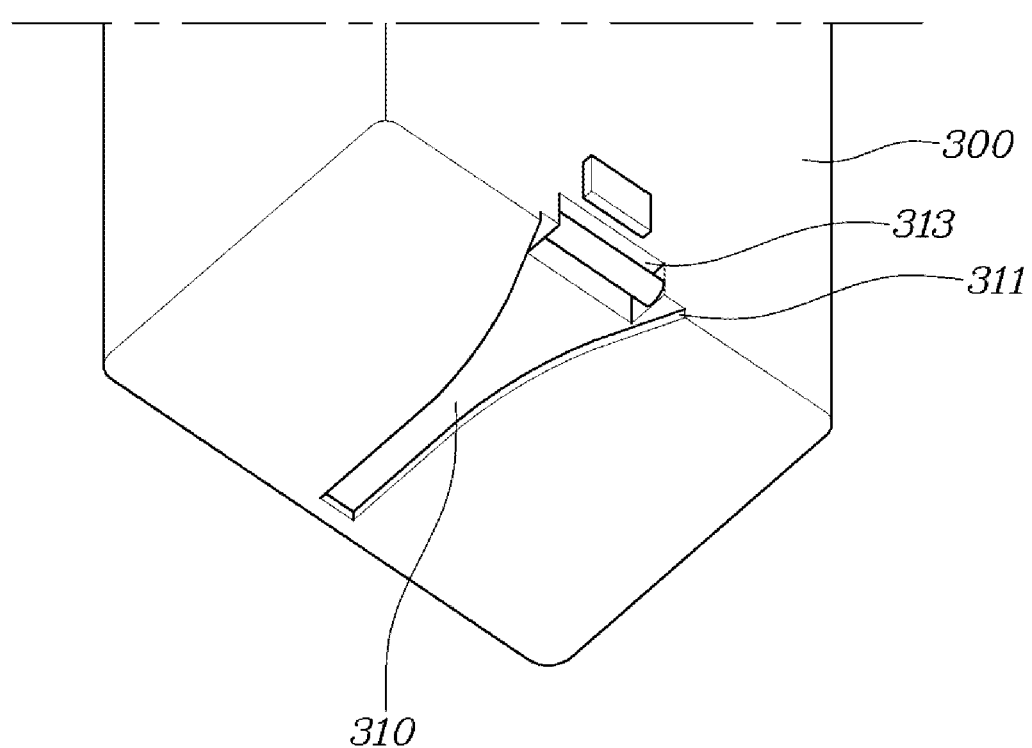
FIG. 3 is a diagram illustrating the bottom surface of a container loaded on the mobile robot in accordance with the exemplary embodiment of the present invention.

FIG. 1 is a block diagram schematically illustrating a detailed configuration of a mobile robot in accordance with various exemplary embodiments of the present invention, FIG. 2 is a perspective view exemplarily illustrating the mobile robot in accordance with the exemplary embodiment of the present invention, and FIG. 3 is a diagram illustrating the bottom surface of a container loaded on the mobile robot in accordance with the exemplary embodiment of the present invention.

Figure 4:
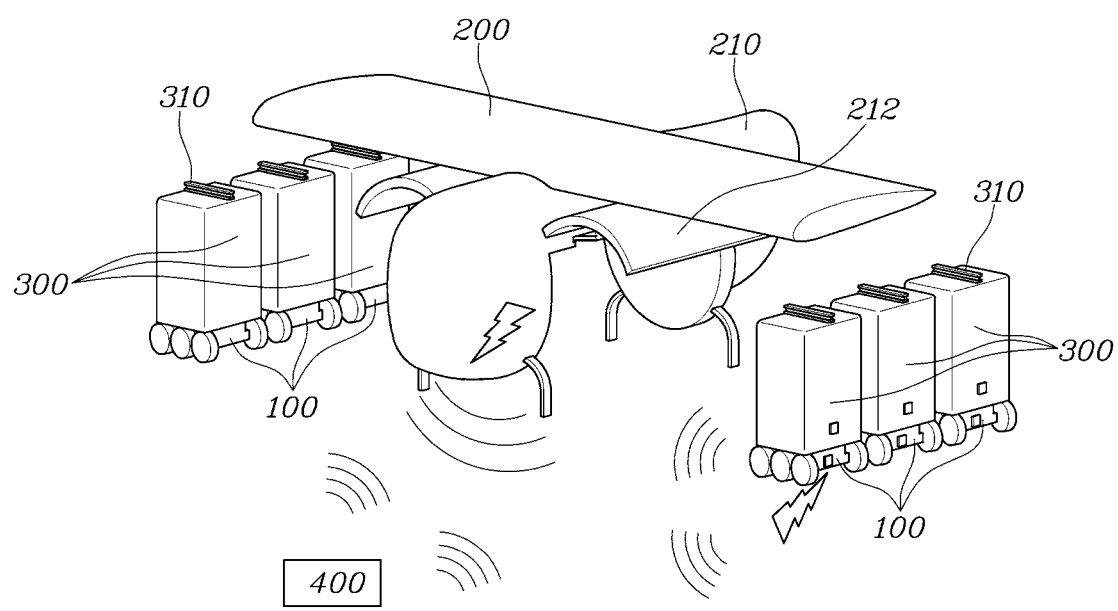
FIG. 4 is a diagram illustrating a configuration of a cargo transporting system including the mobile robot in accordance with the exemplary embodiment of the present invention.
Figure 5:
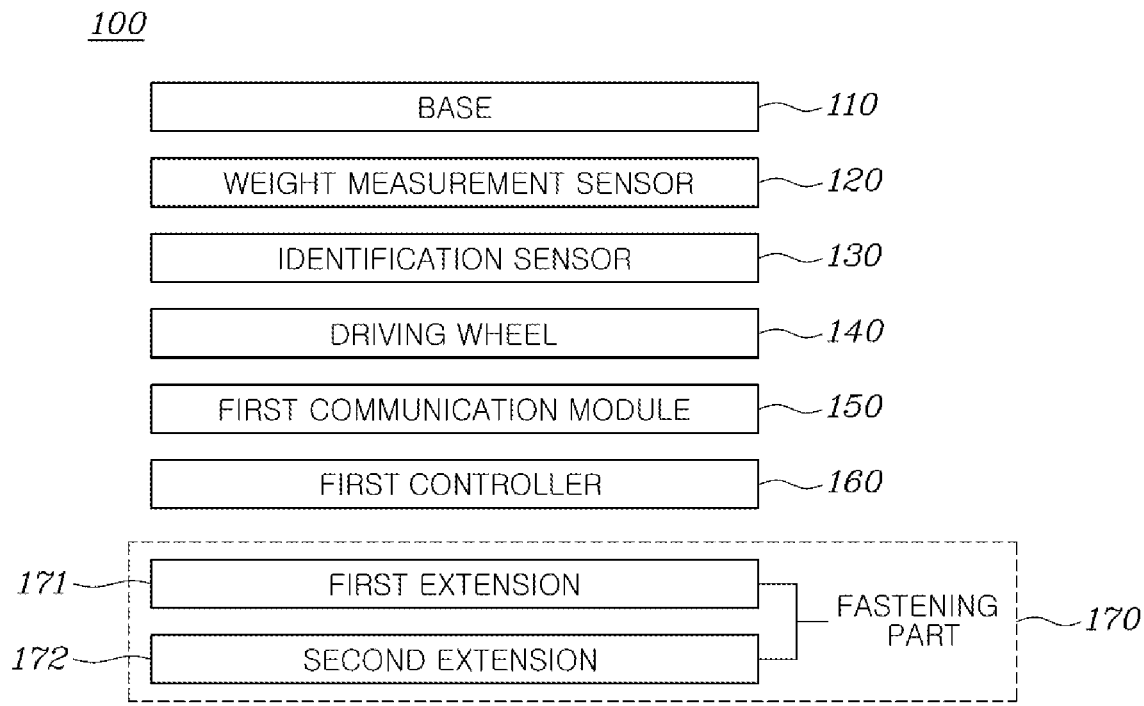
FIG. 5 is a block diagram schematically illustrating a detailed configuration of the mobile robot in the cargo transporting system including the mobile robot in accordance with the exemplary embodiment of the present invention.
Figure 6:
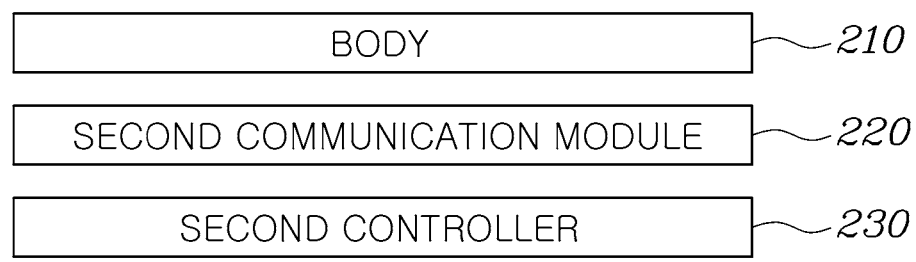
FIG. 6 is a block diagram schematically illustrating a detailed configuration of an air vehicle in the cargo transporting system including the mobile robot in accordance with the exemplary embodiment of the present invention.
Figure 7:
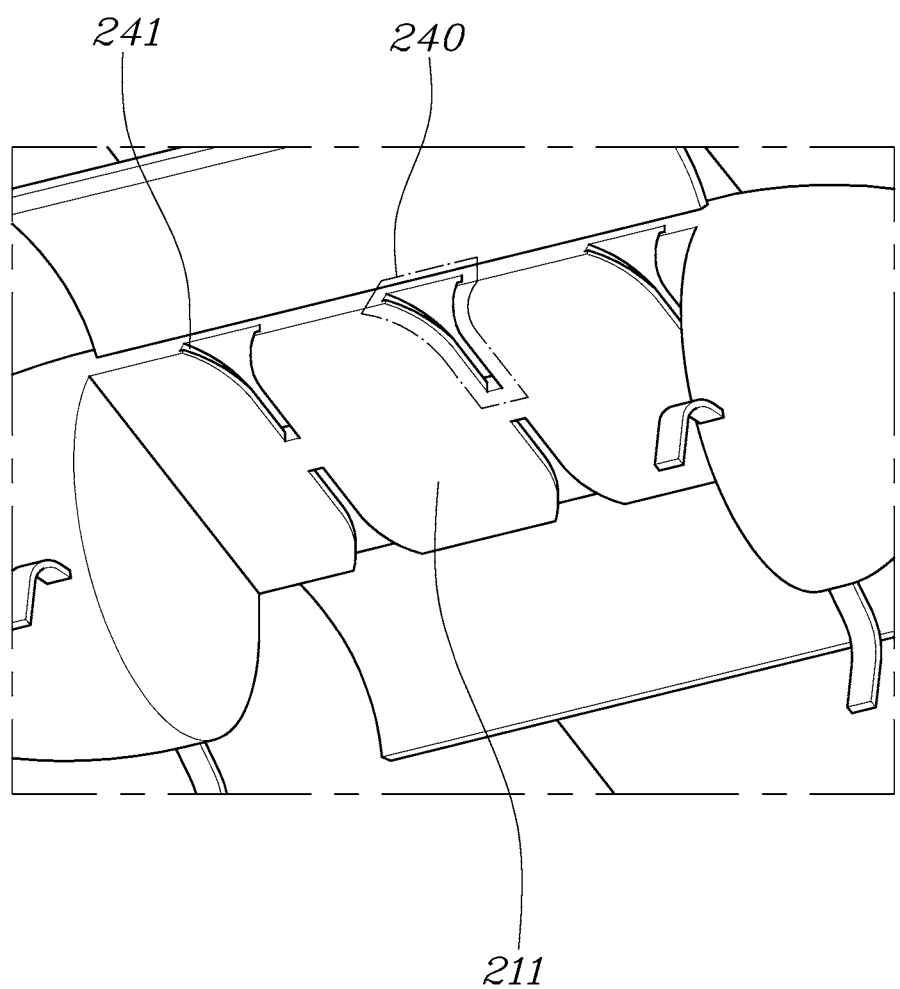
FIG. 7 is a diagram illustrating a loading space of the air vehicle, on which a container is loaded, in the cargo transporting system including the mobile robot in accordance with the exemplary embodiment of the present invention.
Figure 8:
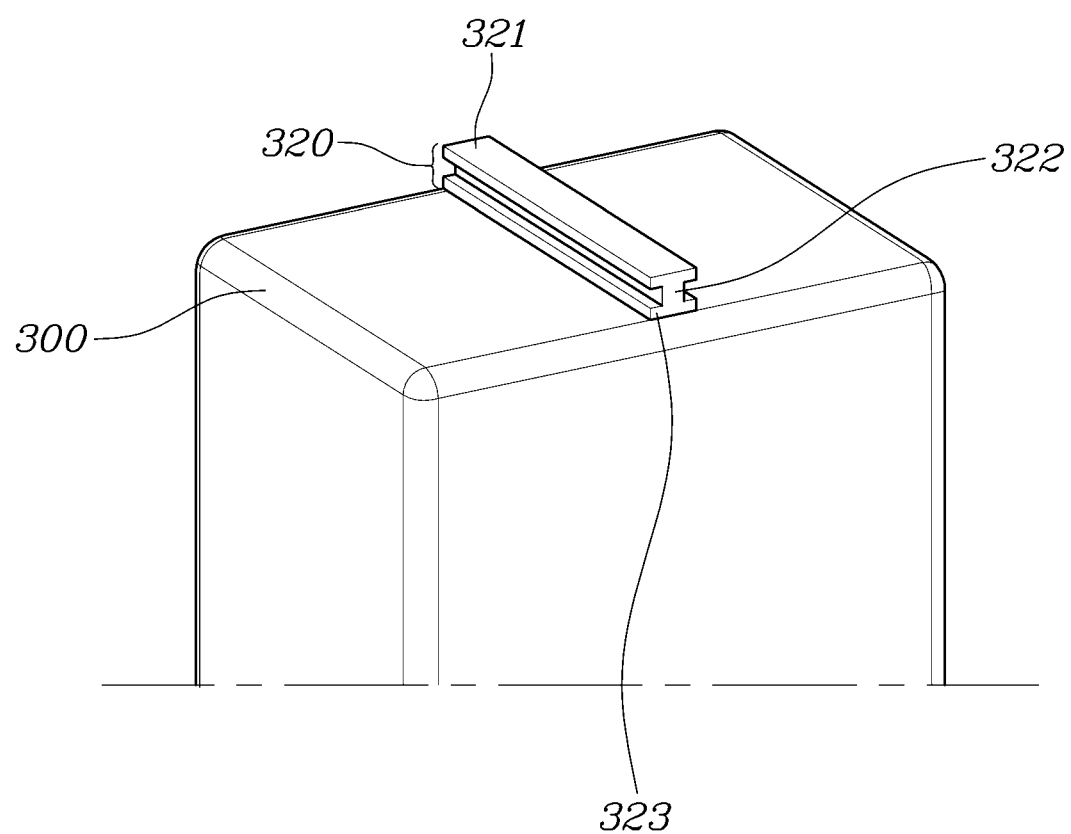
FIG. 8 is a diagram illustrating the top portion of a container loaded on the air vehicle in the cargo transporting system including the mobile robot in accordance with the exemplary embodiment of the present invention.
Figure 9:
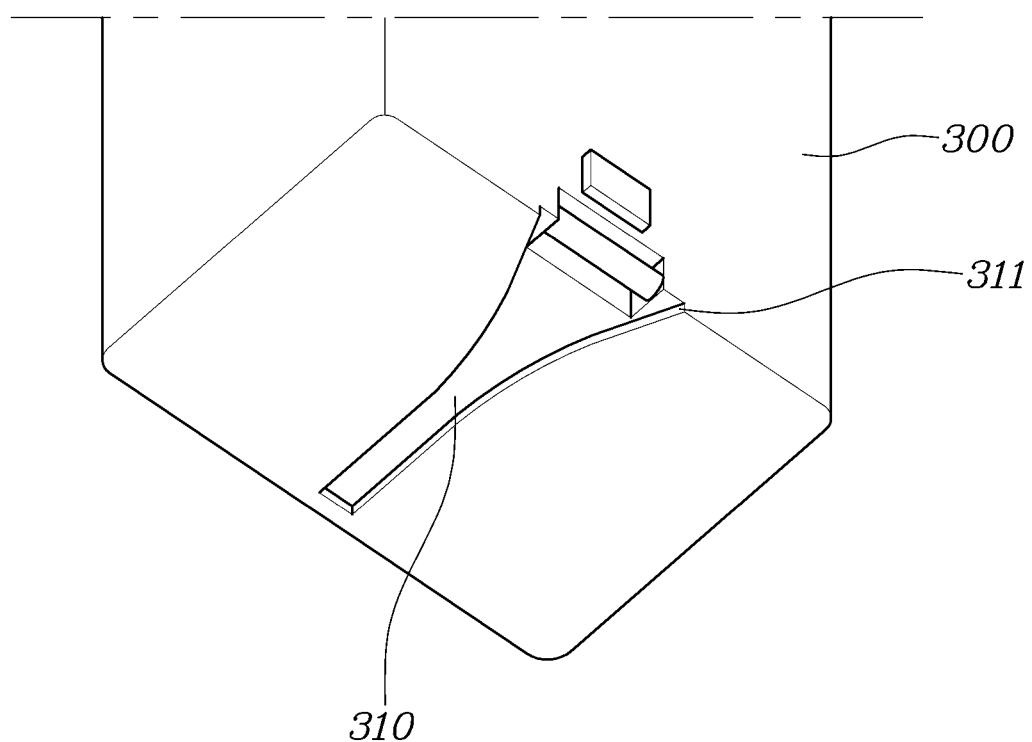
FIG. 9 is a diagram illustrating the bottom portion of the container loaded on the mobile robot in the cargo transporting system including the mobile robot in accordance with the exemplary embodiment of the present invention.
Figure 10:
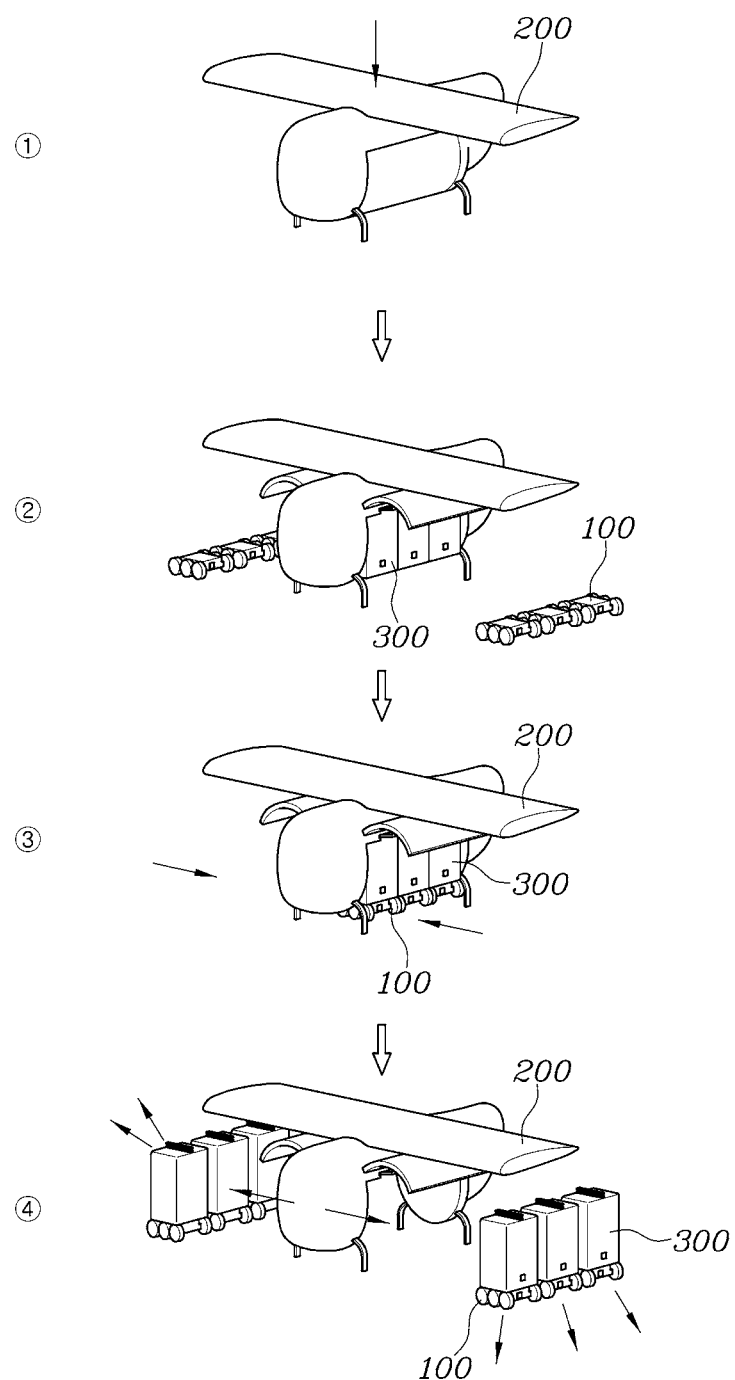
FIG. 10 is a diagram for describing the principle that the cargo transporting system including the mobile robot in accordance with the exemplary embodiment of the present invention is operated.
Figure 11:
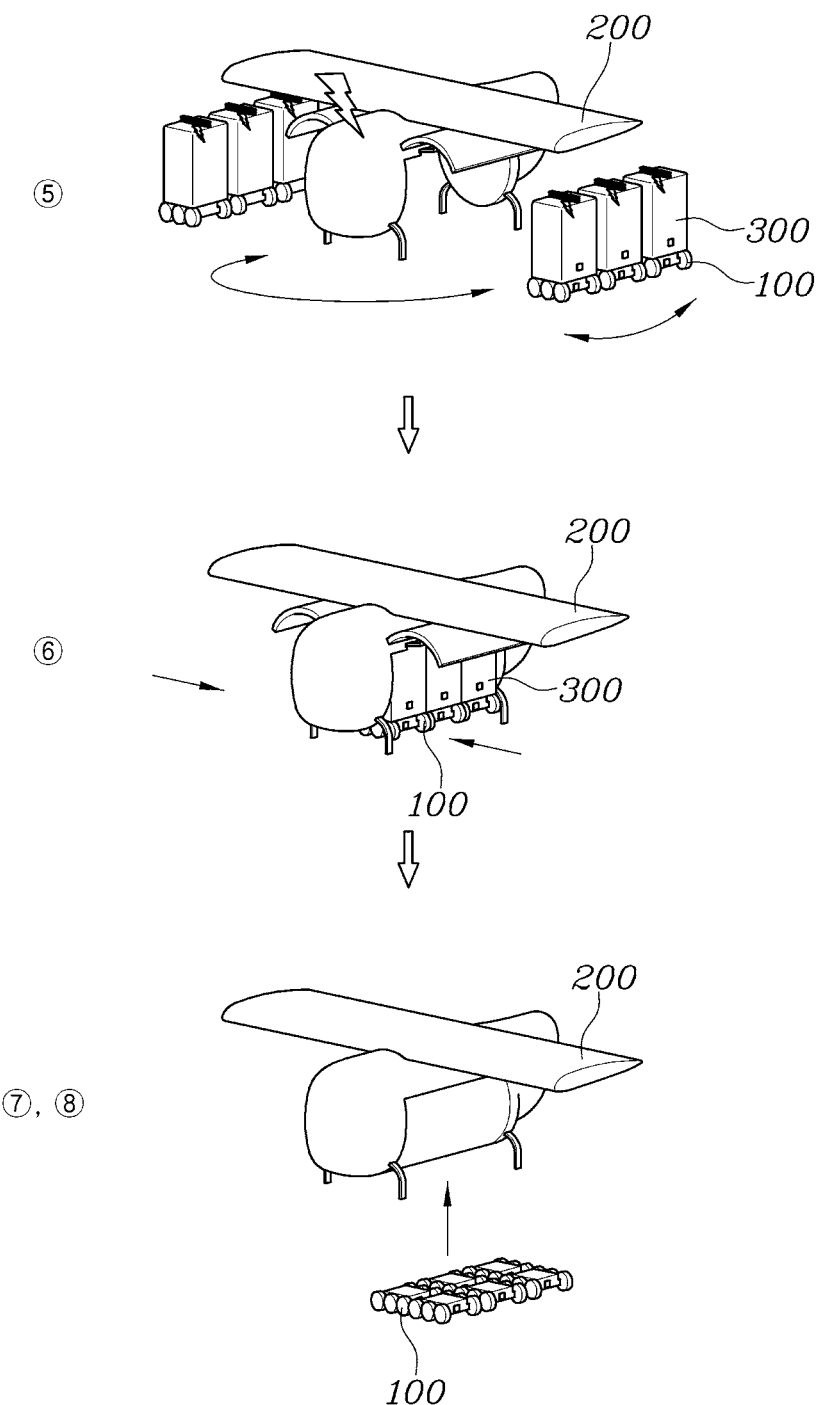
FIG. 11 is a diagram for describing the principle that a cargo transporting system including a mobile robot in accordance with various exemplary embodiments of the present invention is operated.
Figure 12:
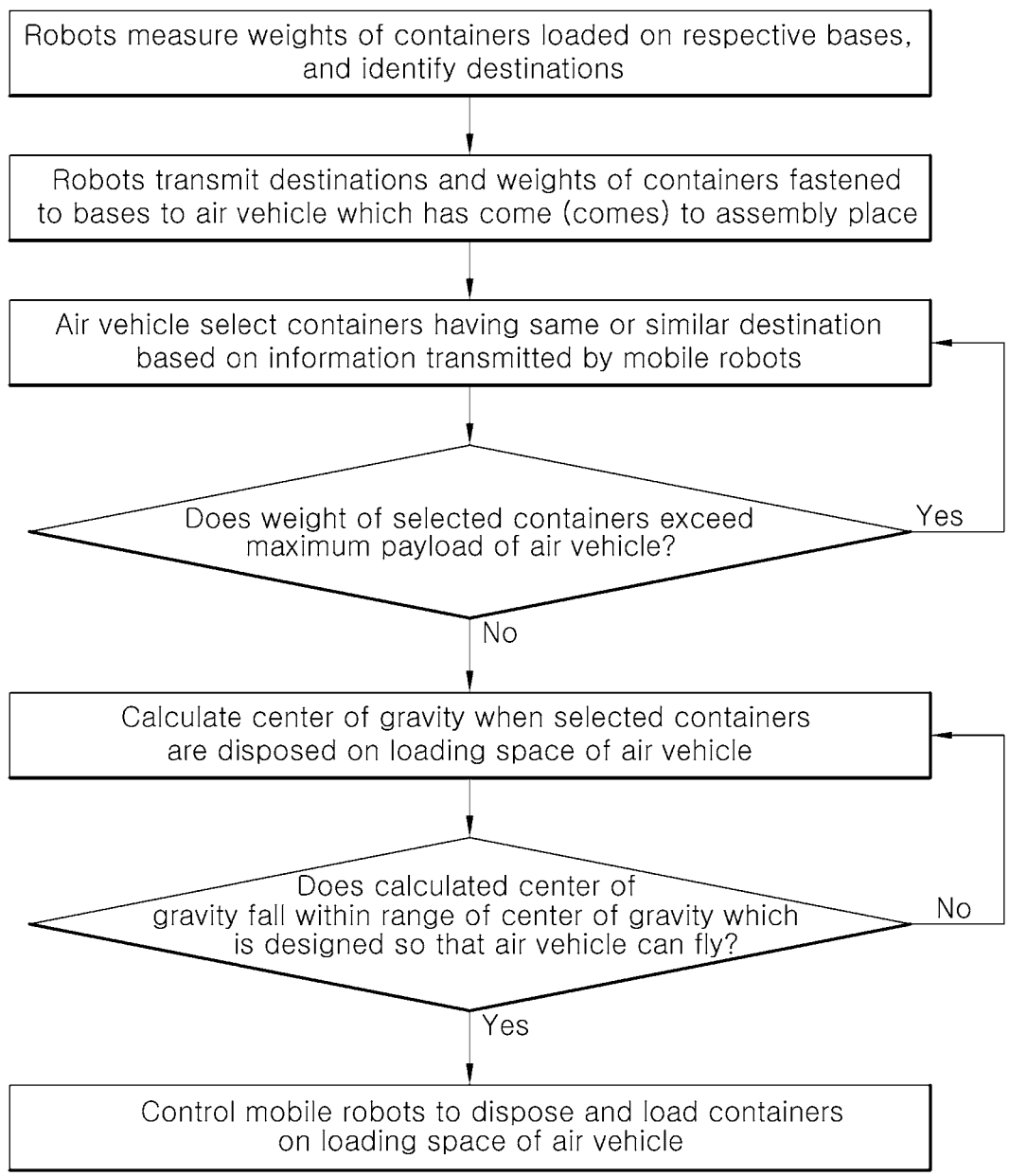
FIG. 12 is a flowchart for describing a process of selecting a loading position based on the center of gravity of a container in the cargo transporting system including the mobile robot in accordance with the exemplary embodiment of the present invention.

FIG. 4 is a diagram illustrating a configuration of a cargo transporting system including the mobile robot in accordance with the exemplary embodiment of the present invention, FIG. 5 is a block diagram schematically illustrating a detailed configuration of the mobile robot in the cargo transporting system including the mobile robot in accordance with the exemplary embodiment of the present invention, FIG. 6 is a block diagram schematically illustrating a detailed configuration of an air vehicle in the cargo transporting system including the mobile robot in accordance with the exemplary embodiment of the present invention, FIG. 7 is a diagram illustrating a loading space of the air vehicle, on which a container is loaded, in the cargo transporting system including the mobile robot in accordance with the exemplary embodiment of the present invention, FIG. 8 is a diagram illustrating the top portion of a container loaded on the air vehicle in the cargo transporting system including the mobile robot in accordance with the exemplary embodiment of the present invention, FIG. 9 is a diagram illustrating the bottom portion of the container loaded on the mobile robot in the cargo transporting system including the mobile robot in accordance with the exemplary embodiment of the present invention, FIG. 10 is a diagram for describing the principle that the cargo transporting system including the mobile robot in accordance with the exemplary embodiment of the present invention is operated, FIG. 11 is a diagram for describing the principle that a cargo transporting system including a mobile robot in accordance with various exemplary embodiments of the present invention is operated, and FIG. 12 is a flowchart for describing a process of selecting a loading position based on the center of gravity of a container in the cargo transporting system including the mobile robot in accordance with the exemplary embodiment of the present invention.

A mobile robot 100 in accordance with various exemplary embodiments of the present invention may transport a container 300 having a cargo contained therein to an air vehicle 200, load the container 300 at a predetermined place of the air vehicle 200, unload the container 300 from the air vehicle 200, identify the unloaded container 300, and transport the identified container 300 to a predetermined location. According to various exemplary embodiments of the present invention, the predetermined location may indicate a storage place or assembly place where the container 300 is loaded before transported to a final destination. According to another exemplary embodiment of the present invention, the predetermined location may indicate the final destination to which the container 300 needs to be transported.

Referring to FIG. 1 and FIG. 2, the mobile robot 100 may include a base 110, a weight measurement sensor 120, an identification sensor 130, a driving wheel 140, a first communication module 150 and a first controller 160. Furthermore, the mobile robot 100 may further include a fastening portion 170.

The container 300 may be loaded on the base 110. Referring to FIG. 2, the base 110 may have a first coupling portion 111 to be coupled to the container 300. Furthermore, the container 300 may have a second coupling portion 310 to be coupled to the base 110 as illustrated in FIG. 3.

The first coupling portion 111 may be formed on the top surface of the mobile robot 100, and have a protruding with a predetermined area and thickness. According to various exemplary embodiments of the present invention, the first coupling portion 111 may be a protrusion having a rectangular cross-section and a predetermined thickness, as illustrated in FIG. 2. However, this is only various exemplary embodiments of the present invention, and the shape of the first coupling portion 111 is not limited thereto.

As illustrated in FIG. 3, the second coupling portion 310 formed on the bottom surface of the container 300 loaded on the base 110 may have a first gap 311 to which the first coupling portion 111 is slid and fitted. The first gap 311 may have a width that decreases from the entrance, to which the first coupling portion 111 is fitted, toward an opposite side thereof.

At the present time, the width of the first gap 311 formed in the second coupling portion 310 may be equal to or greater than the width of the first coupling portion 111.

While the width of the first gap 311 formed in the second coupling portion 310 is equal to or greater than the width of the first coupling portion 111, the first gap 311 may be formed so that the width thereof decreases from the entrance, to which the first coupling portion 111 is fitted, toward the side to which the first coupling portion 111 is slid, to guide the sliding of the first coupling portion 111. Thus, the first coupling portion 111 may be easily coupled to the second coupling portion 310.

Referring to FIG. 2, the fastening portion 170 may include a first extension 171 extended from a side surface of the base 110 and a second extension 172 extended upwards from an end portion of the first extension 171. As illustrated in FIG. 3, the fastening portion 170 may be inserted into the container 300 having a space into which the second extension 172 may be inserted, and thus fastened to the container 300.

Referring to FIG. 2 and FIG. 3, the process of coupling the container 300 to the mobile robot 100 may be described again as follows. The first coupling portion 111 formed on the base 110 and the second coupling portion 310 formed on the container 300 may be coupled to each other, and the second extension 172 may be inserted into an insertion space formed in the container 300 such that the container 300 is coupled and loaded onto the mobile robot 100.

In other words, the coupling between the first and second coupling portions 111 and 310 and the coupling between the second extension 172 and the insertion space formed in the container 300 may restrict the mobile robot 100 and the container 300 from horizontally moving, but the mobile robot 100 and the container 300 may freely move in a vertical direction because the mobile robot 100 and the container 300 are not vertically coupled to each other. Thus, when the air vehicle 200 takes off after the container 300 is loaded on the air vehicle 200 through the mobile robot 100, the container 300 may be easily separated from the mobile robot 100 while vertically rising.

The weight measurement sensor 120 is configured to measure the weight of the container 300 loaded on the base 110, and the identification sensor 130 is configured to identify the destination information related to the container 300. According to various exemplary embodiments of the present invention, when the destination information related to the container 300 is marked as a barcode, the identification sensor 130 may be a barcode scanner to scan the corresponding barcode. However, this is only various exemplary embodiments of the present invention, and other various sensors may be applied as the identification sensor 130 in various exemplary embodiments of the present invention as long as the sensors may be configured to identify the destination information related to the container 300.

The driving wheel 140 is configured to move the base 110. Although not illustrated in detail in the drawings, the mobile robot 100 may include a driving motor configured to drive the driving wheel 140 and a battery configured to apply power to the driving motor. According to various exemplary embodiments of the present invention, three driving wheels 140 may be provided and arranged on either side of the base 110 of the mobile robot 100 as illustrated in FIG. 2. However, this is only various exemplary embodiments of the present invention, and the number of the driving wheels 140 provided on the mobile robot 100 and the arrangement of the driving wheels 140 are not limited thereto.

The first communication module 150 is configured to communicate with a server 400, the air vehicle 200 or another mobile robot 100. According to various exemplary embodiments of the present invention, the server 400 is configured as a control server, and control motions of the mobile robot 100 and the air vehicle 200 through communication with one or more of the mobile robot 100 and the air vehicle 200.

The first controller 160 may determine a loading position of the air vehicle 200, at which the container 300 is to be loaded, and control the mobile robot 100 to load the container 300 at the determined loading position or control the mobile robot 100 to transport the container 300, unloaded from the air vehicle 200, to a destination to which the container 300 is to be transported, according to one or more pieces of information among the weight of the container 300, measured by the weight measurement sensor 120, the destination of the container 300, identified by the identification sensor 130, and various pieces of information related to the air vehicle 200. The various pieces of information related to the air vehicle 200 may include information on the maximum loading weight which may be loaded on the air vehicle 200, and the center of gravity limit of the air vehicle 200. According to various exemplary embodiments of the present invention, the mobile robot 100 may receive the various pieces of information related to the air vehicle 200 through communication with the server 400 or the air vehicle 200.

According to various exemplary embodiments of the present invention, when the plurality of mobile robots 100 are provided, the mobile robots 100 may share the weight information related to the container 300 loaded on the base 110 through the first communication module 150, and the first controllers 160 included in the respective mobile robots 100 may determine the center of gravity and the total weight of the containers 300 to be loaded on the air vehicle 200, according to the shared weight information, and determine loading positions at which the containers 300 loaded on the respective mobile robots 100 are to be loaded, according to the determined total weight and the determined center portion of gravity.

In other words, the first controller 160 mounted on each of the mobile robots 100 may compare the determined total weight and the determined center of gravity to the limit weight which may be loaded on the air vehicle 200 and the center of gravity limit of the air vehicle 200, and determine a loading position at which the container 300 loaded on the mobile robot 100 is to be loaded such that weight distribution does not exceed the limit value of the air vehicle 200. Accordingly, the first controller 160 may control the mobile robot 100 to transport the container 300 to the determined loading position such that the container 300 is loaded.

Hereafter, the cargo transporting system including the mobile robot 100 in accordance with the exemplary embodiment of the present invention will be described with reference to FIGS. 5 to 12.

The cargo transporting system including the mobile robot 100 in accordance with the exemplary embodiment of the present invention may include the air vehicle 200 and the mobile robot 100. The air vehicle 200 may include a loading space 211 on which the container 300 having a cargo contained therein is loaded, and transport the container 300 to an assembly place of the container 300, and the mobile robot 100 may transport the container 300 to the air vehicle 200, load the container 300 at a predetermined place of the air vehicle 200, unload the container 300 from the air vehicle 200, identify the unloaded container 300, and transport the identified container 300 to a predetermined location.

The mobile robot 100 may include one or more of the base 110, the weight measurement sensor 120, the identification sensor 130, the driving wheel 140, the first communication module 150 and the first controller 160. The base 110 may have the container 300 loaded thereon. The weight measurement sensor 120 may measure the weight of the container 300. The identification sensor 130 may identify the destination information related to the container 300. The driving wheel 140 may move the base 110. The first communication module 150 may communicate with the server 400, the air vehicle 200 or another mobile robot 100. The first controller 160 may determine a loading position of the air vehicle 200, at which the container 300 is to be loaded, and control the mobile robot 100 to load the container 300 at the determined loading position or control the mobile robot 100 to transport the container 300, unloaded from the air vehicle 200, to the destination to which the container 300 is to be transported, according to one or more pieces of information among the weight of the container 300, measured by the weight measurement sensor 120, the destination of the container 300, identified by the identification sensor 130, and the various pieces of information related to the air vehicle 200.

Furthermore, the mobile robot 100 may transmit one or more pieces of information between the weight and destination of each container 300 to the server 400, the air vehicle 200 or another mobile robot 100 through the first communication module 150.

The air vehicle 200 may include a body 210, a second communication module 220 and a second controller 230. The body 210 may have the loading space 211 of which the bottom surface is open and on which the container 300 is loaded, and include a door 212 which is provided on a side surface thereof and opened or closed as the container 300 is loaded or unloaded. The second communication module 220 may communicate with the mobile robot 100 or the server 400. The second controller 230 may select the containers 300 to be loaded on the air vehicle 200 and determine the center of gravity of the selected containers 300, according to one or more pieces of information among the weights and destinations of the containers 300, transmitted from the mobile robot 100, and the various pieces of information related to the air vehicle 200, and determine loading positions of the loading space 211, to which the respective containers 300 are to be coupled, based on the determined center portion of gravity.

The air vehicle 200 may transmit the loading positions, to which the respective containers 300 are to be coupled, to the respective mobile robots 100 on which the selected containers 300 are loaded, through the second communication module 220.

When receiving the loading positions, to which the respective containers 300 are to be coupled, from the air vehicle 200, the mobile robots 100 may move to the air vehicle 200 and couple the containers 300 to the corresponding loading positions.

According to various exemplary embodiments of the present invention, in the cargo transporting system including the mobile robot 100, the first controller 160 of the mobile robot 100 may determine a loading position on which the container 300 is to be loaded, and control the mobile robot 100 to couple the container 300 to the determined loading position. According to another exemplary embodiment of the present invention, the second controller 230 of the air vehicle 200 may determine a loading position on which the container 300 is to be loaded, and then transmit the loading position information to the mobile robot 100. Accordingly, the mobile robot 100 may move to the air vehicle 200, and couple the corresponding container 300 to the transmitted loading position.

The mobile robot 100 may have the first coupling portion 111 to be coupled to the container 300, the container 300 may have the second coupling portion 310 formed on the bottom surface thereof and coupled to the first coupling portion 111 and a third coupling portion 320 formed on the top surface thereof and coupled to the loading space 211 of the air vehicle 200. The air vehicle 200 may have a fourth coupling portion 240 formed in the loading space 211 and coupled to the third coupling portion 320.

The first coupling portion 111 may be formed on the top surface of the mobile robot 100, and have a protruding shape with a predetermined area and thickness. According to various exemplary embodiments of the present invention, the first coupling portion 111 may be a protrusion having a rectangular cross-section and a predetermined thickness, as illustrated in FIG. 2.

As illustrated in FIG. 9, the second coupling portion 310 formed on the bottom surface of the container 300 loaded on the base 110 may have the first gap 311 to which the first coupling portion 111 is slid and fitted. The first gap 311 may have a width that decreases from the entrance, to which the first coupling portion 111 is fitted, toward an opposite side thereof.

At the present time, the width of the first gap 311 formed in the second coupling portion 310 may be equal to or greater than the width of the first coupling portion 111.

While the width of the first gap 311 formed in the second coupling portion 310 is equal to or greater than the width of the first coupling portion 111, the first gap 311 may be formed so that the width thereof decreases from the entrance, to which the first coupling portion 111 is fitted, toward the side to which the first coupling portion 111 is slid, to guide the sliding of the first coupling portion 111. Thus, the first coupling portion 111 may be easily coupled to the second coupling portion 310.

The mobile robot 100 may further include the fastening portion 170 including the first extension 171 extended from a side surface of the base 110 and the second extension 172 extended upwards from an end portion of the first extension 171, and the fastening portion 170 may be inserted into the container 300 having a space into which the second extension 172 may be inserted, and thus fastened to the container 300.

In an exemplary embodiment of the present invention, a hooking device 313 is formed at an entrance of second coupling portion 310, such that the second extension 172 is fastens to the hooking device 313.

In an exemplary embodiment of the present invention, a width of the hooking device 313 is smaller than a width of the entrance of second coupling portion 310.

The process of coupling the container 300 to the mobile robot 100 may be described again as follows. The first coupling portion 111 provided on the base 110 and the second coupling portion 310 provided on the container 300 may be coupled to each other, and the second extension 172 may be inserted into an insertion space formed in the container 300 such that the container 300 is coupled and loaded onto the mobile robot 100.

In other words, the coupling between the first and second coupling portions 111 and 310 and the coupling between the second extension 172 and the insertion space formed in the container 300 may restrict the mobile robot 100 and the container 300 from horizontally moving, but the mobile robot 100 and the container 300 may freely move in a vertical direction because the mobile robot 100 and the container 300 are not vertically coupled to each other. Thus, when the air vehicle 200 takes off after the container 300 is loaded on the air vehicle 200 through the mobile robot 100, the container 300 may be easily separated from the mobile robot 100 while vertically rising.

The third coupling portion 320 may include a bottom portion 323 having a predetermined area and thickness, a top portion 321 having a predetermined area and thickness, and a connection portion 322 which connects the top portion 321 and the bottom portion 323 and has a smaller area than the top portion 321 and the bottom portion 323. According to various exemplary embodiments of the present invention, the third coupling portion 320 may be a protrusion which is formed on the top portion of the container 300 and has an T-shaped cross-section, as illustrated in FIG. 8.

The fourth coupling portion 240 may be provided on the loading space 211 of the air vehicle 200, and have a second gap 241 which has a width equal to or greater than the thickness of the top portion 321 such that the top portion 321 of the third coupling portion 320 slides and fitted to the second gap 241. At the instant time, the width of the second gap 241 may decrease from the entrance, to which the top portion 321 of the third coupling portion 320 is fitted, to the opposite side thereof.

Furthermore, the width of the second gap 241 formed in the fourth coupling portion 240 may be equal to or greater than the width of the connection portion of the third coupling portion 320.

Referring to FIGS. 7 and 8, the process of coupling the third coupling portion 320 of the container 300 to the fourth coupling portion 240 formed in the loading space 211 of the air vehicle 200 will be described again as follows. When the mobile robot 100 having the container 300 loaded thereon arrives at the bottom portion of the air vehicle 200, the mobile robot 100 may move to the loading position at which the loaded container 300 is to be loaded, and fit and couple the third coupling portion 320 to the fourth coupling portion 240 by sliding the third coupling portion 320 of the container 300 at the entrance of the fourth coupling portion 240.

In other words, as the top portion 321 of the container 300 is slid and coupled to the second gap 241 of the fourth coupling portion 240, the container 300 may be restricted from vertically moving. As the connection portion 322 of the container 300 is restricted from horizontally moving while the movement thereof is restricted within the width of the second gap 241, the third coupling portion 320 of the container 300 may be coupled to the fourth coupling portion 240 of the loading space 211.

FIG. 10 illustrates the principle that the cargo transporting system including the mobile robot in accordance with the exemplary embodiment of the present invention is operated. Referring to FIG. 10, when the air vehicle 200 lands on an assembly place such as an airport, the door 212 of the air vehicle 200 is opened, the mobile robot 100 may approach the bottom portion of the air vehicle 200, couple the first coupling portion 111 to the second coupling portion 310 of the container 300 loaded on the loading space 211 of the air vehicle 200, unload the container 300, identify the unloaded container 300, and transport the container 300 to a predetermined location.

FIG. 11 illustrates the principle that a cargo transporting system including a mobile robot in accordance with various exemplary embodiments of the present invention is operated. Referring to FIG. 11, the air vehicle 200 may select the containers 300 to be loaded on the air vehicle 200 and determine the center of gravity of the selected containers 300, based on the weight and destination information related to the respective containers 300, transmitted from the mobile robot 100 having the container 300 loaded thereon, determine loading positions of the loading space 211, at which the respective containers 300 are to be coupled, based on the determined center portion of gravity, and then transmit the loading positions, to which the respective containers 300 are to be coupled, to the mobile robot 100 having the selected containers 300 loaded thereon, through the second communication module 220.

When receiving the loading positions, to which the respective containers 300 are to be coupled, from the air vehicle 200, the mobile robots 100 may move to the air vehicle 200, couple the containers 300 to the respective loading positions, and confirm that the containers 300 are loaded at the predetermined loading positions. Accordingly, the air vehicle 200 may take off, and the containers 300 and the mobile robots 100 may be decoupled from each other.

Referring to FIG. 12, the process of selecting the loading positions based on the center of gravity of the containers 300 in the cargo transporting system including the mobile robot 100 in accordance with the exemplary embodiment of the present invention will be referred to as follows.

First, the mobile robots 100 may measure the weights of the containers 300 loaded on the bases 110 thereof, identify the destinations of the containers 300, and transmit the measured weights and destinations to the air vehicle 200 which stays in the assembly area or will come to the assembly area.

Accordingly, the air vehicle 200 may select the containers 300 having the same or similar destination, based on the information transmitted from the mobile robots 100, and check whether the weights of the selected containers 300 exceed the maximum payload of the air vehicle 200.

When the weight of the selected containers 300 does not exceed the maximum payload of the air vehicle 200, the air vehicle 200 may determine the center of gravity in the case where the selected containers 300 are mounted on the loading space 211 of the air vehicle 200. When the determined center of gravity falls within the range of the center of gravity which is designed so that the air vehicle 200 can fly, the corresponding containers 300 may be mounted and loaded on the loading space of the air vehicle 200.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobile robot which transports a container configured of having a cargo contained therein to an air vehicle, loads the container at a predetermined loading place of the air vehicle, unloads the container from the air vehicle, identifies the unloaded container, and transports the identified container to a predetermined location,
wherein the mobile robot is in plural to be a plurality of mobile robots, and
wherein the plurality of mobile robots shares weight information related to a plurality of containers loaded on bases in the respective mobile robots, and first controllers included in the respective mobile robots determine a total weight and a center of gravity of the plurality of containers to be loaded on the air vehicle, according to the shared weight information, and determine loading places where the plurality of containers loaded on the respective mobile robots are to be loaded, according to the determined total weight and the determined center portion of gravity.

2. The mobile robot of claim 1, wherein each of the mobile robots includes at least one of:
a base having the container loaded thereon;
a weight measurement sensor configured to measure a weight of the container;
an identification sensor configured to identify information related to a destination of the container;
a driving wheel configured to move the base;
a first communication module configured to communicate with a server, the air vehicle or another mobile robot; and
a first controller configured to determine the loading place of the air vehicle, at which the container is to be loaded, and control the mobile robot to load the container at the predetermined loading place or control the mobile robot to transport the container unloaded from the air vehicle, to the destination to which the container is to be transported, according to one or more pieces of information among the weight of the container measured by the weight measurement sensor, the destination of the container identified by the identification sensor, and pieces of information related to the air vehicle.

3. The mobile robot of claim 2, wherein the base has a first coupling portion, and the container has a second coupling portion to be coupled to the first coupling portion of the base.

4. The mobile robot of claim 3,
wherein the first coupling portion is formed on a top surface of the mobile robot, and has a protrusion, and
the second coupling portion has a first gap to which the protrusion of the first coupling portion slides and is fitted, wherein the first gap has a width that decreases from an entrance thereof, to which the first coupling portion is fitted, toward an opposite side thereof.

5. The mobile robot of claim 4, wherein the width of the first gap formed in the second coupling portion is equal to or greater than a width of the first coupling portion.

6. The mobile robot of claim 2, further including a fastening portion including a first extension extended from a side surface of the base and a second extension extended upwards from an end portion of the first extension,
wherein the second extension of the fastening portion is insertable into a space of the container to be fastened to the container.

7. A cargo transporting system comprising:
an air vehicle having a loading space on which a container configured of having a cargo contained therein is loaded, and configured to transport the container to an assembly place of the container; and
a mobile robot configured to transport the container to the air vehicle, load the container at a predetermined loading place of the air vehicle, unload the container from the air vehicle, identify the unloaded container, and transport the identified container to a predetermined location,
wherein the mobile robot has a first coupling portion,
wherein the container has a second coupling portion formed on a bottom surface thereof to be coupled to the first coupling portion, and a third coupling portion formed on a top surface thereof, and
wherein the air vehicle has a fourth coupling portion formed on the loading space to be coupled to the third coupling portion.

8. The cargo transporting system of claim 7, wherein the mobile robot includes at least one of:
a base configured of having the container loaded thereon;
a weight measurement sensor configured to measure a weight of the container;
an identification sensor configured to identify information related to a destination of the container;
a driving wheel configured to move the base;
a first communication module configured to communicate with a server, the air vehicle or another mobile robot; and
a first controller configured to determine the loading place of the air vehicle, at which the container is to be loaded, and control the mobile robot to load the container at the predetermined loading place or control the mobile robot to transport the container unloaded from the air vehicle, to the destination to which the container is to be transported, according to one or more pieces of information among the weight of the container measured by the weight measurement sensor, the destination of the container identified by the identification sensor, and pieces of information related to the air vehicle,
wherein the mobile robot transmits one or more pieces of information among the weight and the destination of the container to the server or the air vehicle through the first communication module.

9. The cargo transporting system of claim 8,
wherein the mobile robot is in plural to be a plurality of mobile robots, and
wherein the air vehicle includes:
a body having an open bottom and a loading space on which a plurality of containers are loaded, and including a door which is formed on a side surface thereof and opened or closed as the plurality of containers are loaded or unloaded;
a second communication module configured to communicate with the plurality of mobile robots or the server; and
a second controller configured to select the plurality of containers to be loaded on the air vehicle and determine a center of gravity of the selected containers, according to one or more pieces of information among weights and destinations of the plurality of containers, transmitted from the plurality of mobile robots, and pieces of information related to the air vehicle, and determine loading places where the respective containers are to be coupled in the loading space, based on the determined center of gravity,
wherein the air vehicle transmits information of the loading places to which the respective containers are to be coupled, to the plurality of mobile robots on which the selected containers are loaded, through the second communication module.

10. The cargo transporting system of claim 7,
wherein the first coupling portion is formed on a top surface of the mobile robot, and has a protrusion, and
wherein the second coupling portion has a first gap to which the protrusion of the first coupling portion is slid and fitted, wherein the first gap has a width that decreases from an entrance thereof, to which the first coupling portion is fitted, toward an opposite side thereof.

11. The cargo transporting system of claim 7,
wherein the third coupling portion includes a bottom portion, a top portion, and a connection portion connecting the top portion and the bottom portion and having an area smaller than an area of the top and bottom portions,
wherein the fourth coupling portion has a second gap which has a width equal to or greater than a thickness of the top portion of the third coupling portion so that the top portion of the third coupling portion slides and is fitted to the second gap, and
wherein the second gap has a width that decreases from an entrance thereof, to which the third coupling portion is fitted, toward an opposite side thereof.

12. The cargo transporting system of claim 11, wherein the width of the second gap formed in the fourth coupling portion is equal to or greater than the width of the connection portion of the third coupling portion.

13. The cargo transporting system of claim 8, wherein the mobile robot further includes a fastening portion including a first extension extended from a side surface of the base and a second extension extended upwards from an end portion of the first extension,
wherein the second extension of the fastening portion is insertable into a space of the container to be fastened to the container.

14. The cargo transporting system of claim 13, wherein a groove is formed at an entrance of the second coupling portion of the container and the second extension is engageable into the groove.

15. The cargo transporting system of claim 14, wherein a width of the groove is smaller than a width of the entrance of the second coupling portion.

* * * * *